US012730079B2

(12) United States Patent
Choi et al.

(10) Patent No.: US 12,730,079 B2
(45) Date of Patent: Sep. 8, 2026

(54) OVERLAY MEASUREMENT APPARATUS AND OVERLAY MEASUREMENT METHOD

(71) Applicant: AUROS Technology, Inc., Hwaseong-si (KR)

(72) Inventors: Seong Yun Choi, Osan-si (KR); Sun Gyun Kim, Seoul (KR)

(73) Assignee: AUROS Technology, Inc., Hwaseong-si (KR)

( * ) Notice: Subject to any disclaimer, the term of this patent is extended or adjusted under 35 U.S.C. 154(b) by 127 days.

(21) Appl. No.: 18/662,651

(22) Filed: May 13, 2024

(65) Prior Publication Data

US 2024/0410835 A1 Dec. 12, 2024

(30) Foreign Application Priority Data

Jun. 9, 2023 (KR) ........................ 10-2023-0074412

(51) Int. Cl.
*G01N 21/95* (2006.01)
*G01N 21/88* (2006.01)

(52) U.S. Cl.
CPC ..... *G01N 21/9501* (2013.01); *G01N 21/8806* (2013.01); *G01N 21/8851* (2013.01); *G01N 2021/8861* (2013.01)

(58) Field of Classification Search
CPC ....... G01N 2021/8861; G01N 21/8806; G01N 21/8851; G01N 21/9501; G03F 7/70633
USPC ...................... 356/237.1–237.6, 239.1–239.8
See application file for complete search history.

(56) References Cited

U.S. PATENT DOCUMENTS 6,801,650 B1 * 10/2004 Kikuchi .............. G03F 7/70691 250/548
8,982,320 B2 * 3/2015 Okita .................. G03F 7/70633 355/72
9,799,112 B2 10/2017 Harada et al.
11,781,996 B1 10/2023 Kang et al.
2003/0223630 A1 * 12/2003 Adel ..................... G03F 9/7011 382/145
2013/0100427 A1 4/2013 Koolen et al.
(Continued)

FOREIGN PATENT DOCUMENTS

EP 1843210 A2 * 10/2007 ............ H01L 21/68
JP 2005019544 A * 1/2005
(Continued)

*Primary Examiner* — Tri T Ton
(74) *Attorney, Agent, or Firm* — WILLIAM PARK AND ASSOCIATES LTD.

(57) ABSTRACT

Disclosed is a system for optimizing a measurement time of an overlay. According to one embodiment, an overlay measurement apparatus is provided. The overlay measurement apparatus includes a light source configured to direct light to a plurality of overlay targets formed on a wafer; a lens unit including: an objective lens and a lens focus actuator; a detector configured to acquire a focus image; a stage on which the wafer is seated; and a controller configured to: control the lens unit, the detector, and the stage to measure a preset collection-purposed overlay target; collect a target coordinate of the collection-purposed overlay target; calculate a correction value based on the target coordinate; move the stage under application of the correction value; and control the lens unit, the detector, and the stage to measure at least one application-purposed overlay target.

12 Claims, 10 Drawing Sheets

(56) References Cited

U.S. PATENT DOCUMENTS

| | | | | |
|---|---|---|---|---|
| 2017/0307983 | A1 | 10/2017 | Den Boef et al. | |
| 2019/0310553 | A1 | 10/2019 | Jochemsen et al. | |
| 2022/0317577 | A1 | 10/2022 | Manassen et al. | |
| 2023/0324817 | A1 * | 10/2023 | Ebert | G03F 7/706851 355/67 |

FOREIGN PATENT DOCUMENTS

| | | | | |
|---|---|---|---|---|
| JP | 2013168595 | A | 8/2013 | |
| KR | 1019990074610 | A | 10/1999 | |
| KR | 100589850 | B1 | 6/2006 | |
| KR | 1020060084922 | A | 7/2006 | |
| KR | 102526522 | B1 * | 4/2023 | G03F 7/70775 |
| TW | 201727789 | A | 8/2017 | |

* cited by examiner

FIG. 8

A-2
C
FOV
A-3
A-4
W
GM
500
B
A-5
A-1
X
Y

FIG. 11

OVERLAY MEASUREMENT APPARATUS AND OVERLAY MEASUREMENT METHOD

CROSS-REFERENCE TO RELATED APPLICATION

The present application claims priority under 35 U.S.C. § 119(a) to Korean Patent Application No. 10-2023-0074412, filed in the Korean Intellectual Property Office on Jun. 9, 2023, which application is incorporated herein by reference in its entirety.

BACKGROUND OF THE DISCLOSURE

1. Field of the Disclosure

The present disclosure relates to overlay measurement of a wafer, and more particularly, to an overlay measurement apparatus and an overlay measurement method.

2. Description of the Related Art

In general, as technology develops, a size of a semiconductor device becomes smaller and a density of an integrated circuit on a wafer increases. In order to form the integrated circuit on the wafer, many manufacturing processes should be performed to sequentially form desired circuit structures and elements at specific locations. This manufacturing process allows for sequential formation of patterned layers on the wafer.

Through these repeated stacking processes, electrically active patterns are generated within the integrated circuit. In this regard, when each structure is not aligned within a tolerance range allowed in a production process, interference occurs between the electrically active patterns, which may cause deterioration in the performance and reliability of the manufactured circuit. To measure and verify alignment errors between these layers, an overlay measurement apparatus is used to find a focus position based on a contrast or a phase difference in an image of the wafer.

In this regard, in order to measure the pattern formed on each layer of the wafer, the wafer is seated on the stage, and then the pattern formed at various positions on the upper surface of the wafer is detected. However, the wafer may not be placed at a correct position on the stage, and may be seated on the stage in a partially misaligned or rotated state. In this case, there is a problem that it takes a long time to move the stage to detect the pattern.

Moreover, in order to detect patterns formed at various positions on the top of the wafer, the stage is moved to each position. In this regard, fine vertical alignment between an optical device and the stage is not achieved, or the pattern have to be aligned with a center of a FOV (field of view) of the optical device every time the stage is displaced for optical alignment of the optical device, due to lens quality, for stage leveling, due to vibration generating when moving the stage, and errors generating during movement.

SUMMARY OF THE DISCLOSURE

The present disclosure is intended to solve the above problem. Thus, a purpose thereof is to provide an overlay measurement apparatus and overlay measurement method in which the misalignment between the wafer and the stage and an offset that occurs each time the stage moves are continuously measured and corrected during an overlay measurement process to improve correction accuracy.

Purposes according to the present disclosure are not limited to the above-mentioned purpose. Other purposes and advantages according to the present disclosure that are not mentioned may be understood based on following descriptions, and may be more clearly understood based on embodiments according to the present disclosure. Further, it will be easily understood that the purposes and advantages according to the present disclosure may be realized using means shown in the claims and combinations thereof.

A first aspect of the present disclosure provides an overlay measurement apparatus comprising: a light source configured to direct light to a plurality of overlay targets formed on a wafer; a lens unit including: an objective lens configured to focus the light on a measurement position of one of the plurality of overlay targets; and a lens focus actuator configured to adjust a distance between the objective lens and a surface of the wafer at the measurement position; a detector configured to acquire a focus image at the measurement position based on a beam reflected from the measurement position; a stage on which the wafer is seated; and a controller configured to: control the lens unit, the detector, and the stage to measure a preset collection-purposed overlay target among the plurality of overlay targets; collect a target coordinate of the collection-purposed overlay target spaced apart from a center of a field of view (FOV) of the lens unit; calculate a correction value based on the target coordinate; move the stage under application of the correction value; and control the lens unit, the detector, and the stage to measure at least one application-purposed overlay target among the plurality of overlay targets.

In one embodiment of the overlay measurement apparatus, the controller includes: a stage actuator configured to control the movement of the stage; a storage for storing therein an image of the collection-purposed overlay target and an image of the application-purposed overlay target obtained using the detector; an offset calculator configured to calculate a distance between the target coordinate of the collection-purposed overlay target and the center of the field of view of the lens unit; and a correction value calculator configured to calculate the correction value based on the target coordinate.

In one embodiment of the overlay measurement apparatus, in measuring the collection-purposed overlay target, the stage actuator is configured to control the stage such that the collection-purposed overlay targets are measured sequentially in an order from the collection-purposed overlay target formed at a site closest to a center of the wafer to the collection-purposed overlay target formed at a site farthest from the center of the wafer.

In one embodiment of the overlay measurement apparatus, the correction value calculator is configured to calculate, as the correction value, an average of distances respectively between a plurality of the target coordinates repeatedly measured by the detector and the center of the field of view of the lens unit.

In one embodiment of the overlay measurement apparatus, the offset calculator is configured to calculate a distance between a target coordinate of the application-purposed overlay target and the center of the field of view of the lens unit.

In one embodiment of the overlay measurement apparatus, the lens unit and the detector are configured to measure a global mark formed on the wafer, wherein the controller is further configured to: calculate a reference coordinate of the wafer based on the global mark; and apply the reference coordinate to calculate the correction value, wherein misalignment between the stage and the wafer is corrected based on the correction value.

A second aspect of the present disclosure provides an overlay measurement method comprising: a collection-purposed overlay target measurement step including: moving a stage on which a wafer is seated; measuring at least one collection-purposed overlay target among a plurality of overlay targets using a lens unit and a detector; collecting a target coordinate of the collection-purposed overlay target spaced from a center of a field of view of the lens unit; and measuring an overlay value of the collection-purposed overlay target; a correction value calculation step of calculating a correction value based on the target coordinate, wherein an error occurring due the movement of the stage is corrected based on the correction value; and an application-purposed overlay target measurement step including: applying the correction value to move the stage; measuring at least one application-purposed overlay target among the plurality of overlay targets using the lens unit and the detector; and measuring an overlay value of the application-purposed overlay target.

In one embodiment of the overlay measurement method, the collection-purposed overlay target measurement step includes: a first stage moving step of moving the stage on which the wafer is seated so that the lens unit is positioned on top of a site where the collection-purposed overlay target is formed; a first pattern measurement step of measuring the collection-purposed overlay target using the lens unit and the detector; and an offset calculation step of calculating a distance between the target coordinate of the collection-purposed overlay target and the center of the field of view of the lens unit.

In one embodiment of the overlay measurement method, the collection-purposed overlay target measurement step includes: measuring a first collection-purposed overlay target, a second collection-purposed overlay target to an n-th collection-purposed overlay target among the plurality of overlay targets; and collecting a first target coordinate of the first collection-purposed overlay target, a second target coordinate of the second collection-purposed overlay target to an n-th target coordinate of the n-th collection-purposed overlay target spaced apart from the center of the field of view of the lens unit.

In one embodiment of the overlay measurement method, the first collection-purposed overlay target, the second collection-purposed overlay target to the n-th collection-purposed overlay target are arranged in an increasing order of a spacing thereof from a center of the wafer, wherein the collection-purposed overlay target measurement step includes: moving the stage to a position where the first collection-purposed overlay target located at a site closest to the center of the wafer is formed, and measuring the first collection-purposed overlay target; and moving the stage to a position where the second collection-purposed overlay target located at a site second closest to the center of the wafer is formed, and measuring the second collection-purposed overlay target.

In one embodiment of the overlay measurement method, the correction value calculation step of calculating, as the correction value, an average of distances respectively between a plurality of target coordinates repeatedly measured in the collection-purposed overlay target measurement step and the center of the field of view of the lens unit.

In one embodiment of the overlay measurement method, the application-purposed overlay target measurement step includes: a second stage moving step of applying the correction value to move the stage so that the lens unit is located on top of a site where the application-purposed overlay target is formed; and a second pattern measurement step of measuring the application-purposed overlay target using the lens unit and the detector.

In one embodiment of the overlay measurement method, the application-purposed overlay target measurement step includes: measuring a first application-purposed overlay target, a second application-purposed overlay target to an n-th application-purposed overlay target among the plurality of overlay targets; and applying the correction value in moving the stage for measuring the first application-purposed overlay target, the second application-purposed overlay target to the n-th application-purposed overlay target.

In one embodiment of the overlay measurement method, the method further comprises, after the application-purposed overlay target measurement step, repeating the correction value calculation step, wherein the application-purposed overlay target measurement step includes calculating a distance between an additional target coordinate of the application-purposed overlay target and the center of the field of view, wherein the correction value calculation step includes calculating the correction value, further based on the additional target coordinate.

In one embodiment of the overlay measurement method, the method further comprises: before the collection-purposed overlay target measurement step, a wafer coordinate calculation step of calculating a reference coordinate of the wafer based on a measuring result of a global mark formed on the wafer using the lens unit and the detector, wherein the correction value calculation step includes applying the reference coordinate to the correction value in order to correct misalignment between the stage and the wafer.

According to some embodiments of the present disclosure as described above, the overlay measurement apparatus and method in accordance with the present disclosure may calculate the offset value from the measurement position in some preset collection-purposed overlay targets among the plurality of overlay targets formed on the wafer, and may apply the offset value as the correction value to remaining application-purposed overlay targets among the plurality of overlay targets, thereby correcting the error that occurs every time the stage moves, reducing the error that occurs in each measurement, and, moreover, and saving a travel time taken for the stage to move to the measurement position. This may result in increasing the measurement accuracy and reducing an effort of an operator.

Effects of the present disclosure are not limited to the effects mentioned above, and other effects not mentioned will be clearly understood by those skilled in the art from the descriptions below.

BRIEF DESCRIPTION OF THE DRAWINGS

FIG. 8 and FIG. 9 are top views showing a collection-purposed overlay target measurement step according to an embodiment of the present disclosure.

FIG. 10 and FIG. 11 are top views showing an application-purposed overlay target measurement step according to an embodiment of the present disclosure.

DETAILED DESCRIPTION OF THE DISCLOSURE

Figure 1:
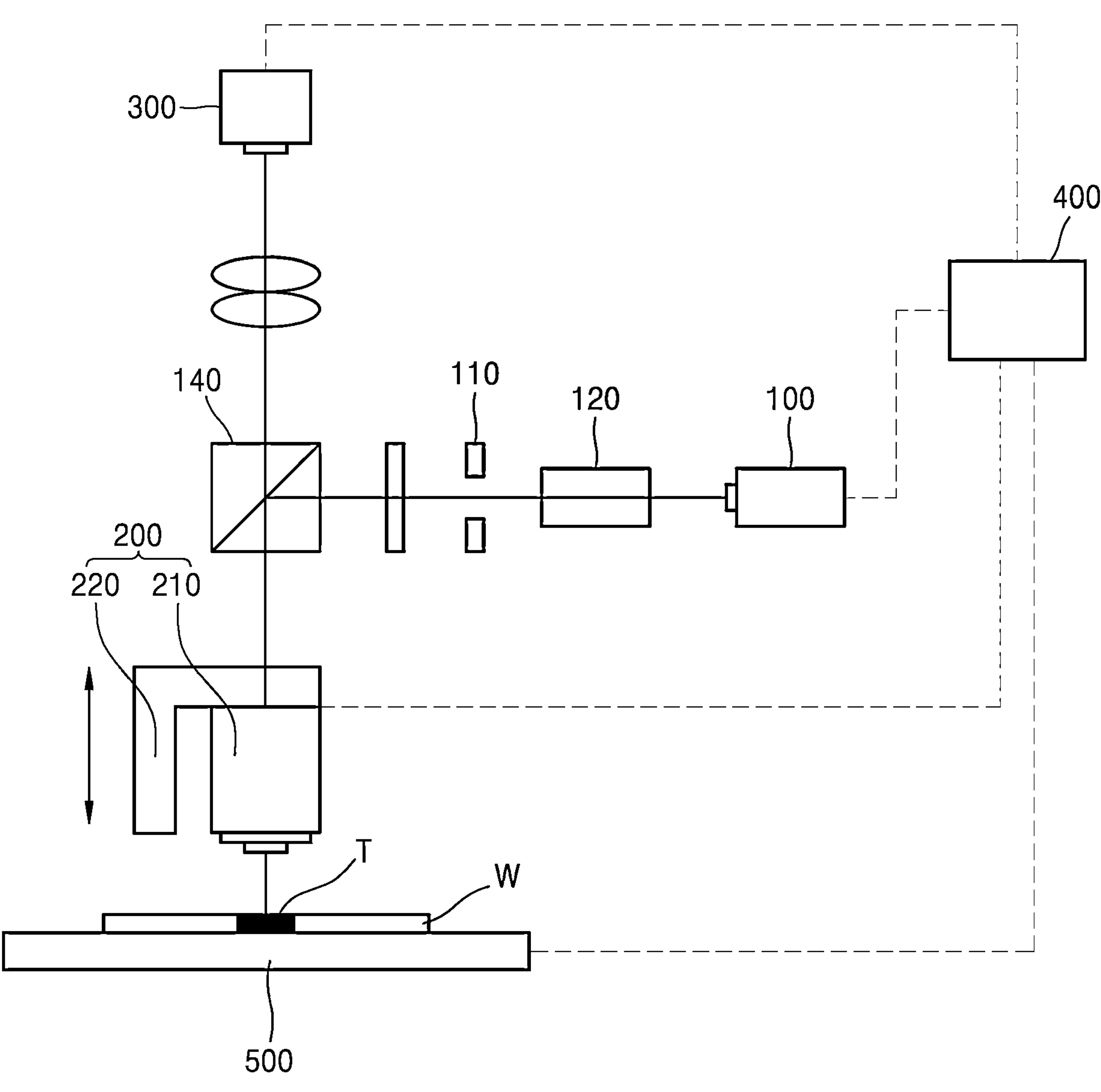
FIG. 1 is a diagram schematically showing an overlay measurement apparatus according to an embodiment of the present disclosure.

Hereinafter, various preferred embodiments of the present disclosure will be described in detail with reference to the attached drawings.

The embodiments of the present disclosure are provided to more completely describe the present disclosure for those skilled in the art. The following embodiments may be modified in various forms, and the scope of the present disclosure is not limited to the following embodiments. Rather, these embodiments are provided so that the present disclosure is thorough and complete, and are provided to fully convey the spirit of the present disclosure to those skilled in the art. Furthermore, a thickness or a size of each layer in the drawing is exaggerated for convenience and clarity of illustration. A shape, a size, a ratio, an angle, a number, etc. disclosed in the drawings for describing embodiments of the present disclosure are illustrative, and the present disclosure is not limited thereto. The same reference numerals refer to the same elements herein.

The terminology used herein is directed to the purpose of describing particular embodiments only and is not intended to be limiting of the present disclosure. As used herein, the singular constitutes "a" and "an" are intended to include the plural constitutes as well, unless the context clearly indicates otherwise. It will be further understood that the terms "comprise", "comprising", "include", and "including" when used in this specification, specify the presence of the stated features, integers, operations, elements, and/or components, but do not preclude the presence or addition of one or more other features, integers, operations, elements, components, and/or portions thereof.

Hereinafter, embodiments of the present disclosure will be described with reference to drawings schematically showing ideal embodiments of the present disclosure. In the drawings, variations of a depicted shape may be expected, depending, for example, on manufacturing techniques and/or tolerances. Therefore, the embodiments of the present disclosure should not be construed as being limited to the specific shape of the area shown herein, and should include, for example, change in a shape caused in a manufacturing process.

An overlay measurement system is a system that measures an error between a first overlay key and a second overlay key respectively formed on different layers formed on a wafer W.

For example, the first overlay key may be an overlay mark formed on a previous layer, and the second overlay key may be an overlay mark formed on a current layer. The overlay mark is formed on a scribe line while a layer for semiconductor device formation is formed in a die area. For example, the first overlay key may be formed together with an insulating film pattern, and the second overlay key may be formed together with a photoresist pattern formed on the insulating film pattern. In this case, the second overlay key is exposed to the outside, but the first overlay key is covered with a photoresist layer and may be made of an oxide with different optical properties from those of the second overlay key made of a photoresist material.

Moreover, physical positions of the first overlay key and the second overlay key are different from each other, while focal planes thereof may be the same or different as or from each other.

Figure 2:
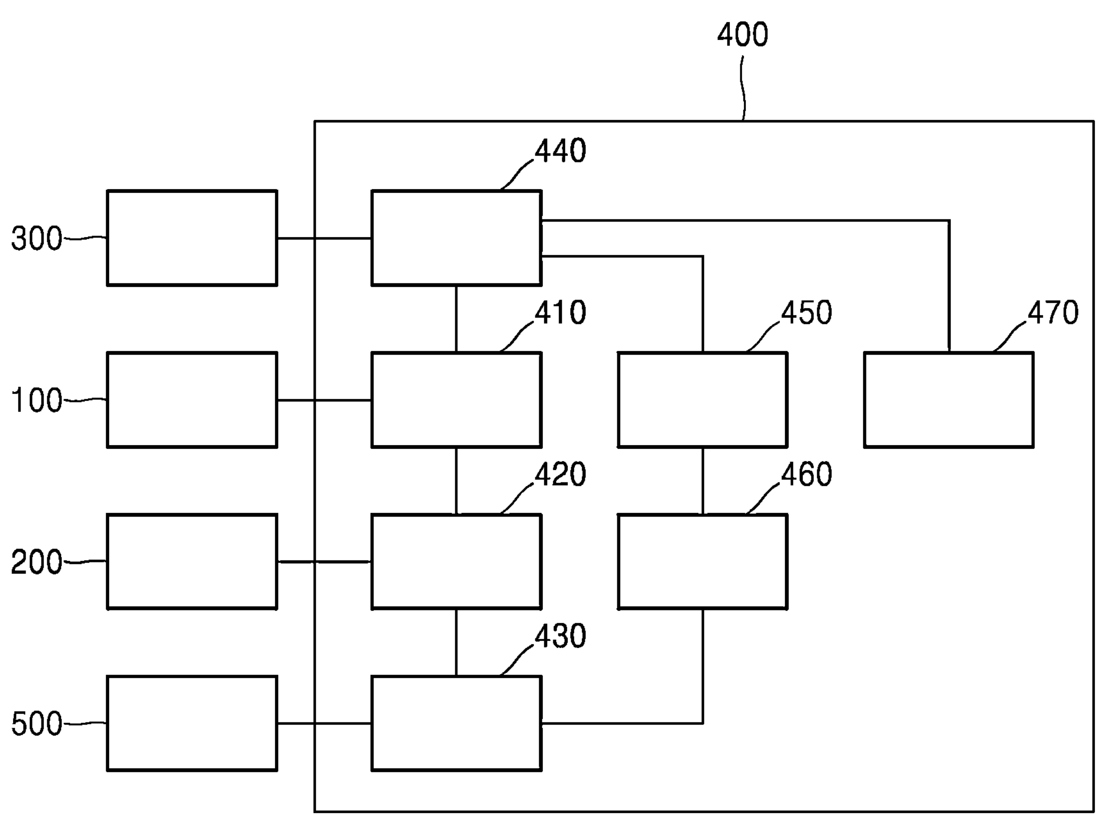
FIG. 2 is a diagram showing a controller of the overlay measurement apparatus of the present disclosure.

FIG. 1 is a diagram schematically showing an overlay measurement apparatus according to an embodiment of the present disclosure, and FIG. 2 is a diagram showing a controller 400 of the overlay measurement apparatus of the present disclosure.

First, the overlay measurement apparatus according to an embodiment of the present disclosure may largely include a light source 100, a lens unit 200, a detector 300, the controller 400, and a stage 500.

As shown in FIG. 1, the light source 100 may irradiate light to a plurality of overlay targets T formed on the wafer W. Specifically, the light source 100 may be configured to irradiate light toward an overlay target T in which the first overlay key formed on the first layer stacked on the wafer W and the second overlay key formed on the second layer stacked on top of the first layer are located.

For example, the light source 100 may be composed of a halogen lamp, a xenon lamp, a supercontinuum laser, a light emitting diode, a laser induced lamp, etc., and may irradiate light of various wavelengths such as ultraviolet (UV) rays, visible light or infrared (IR) rays, etc. However, the present disclosure is not limited thereto.

The overlay measurement apparatus according to an embodiment of the present disclosure may further include an aperture 110, a spectral filter 120, a polarization filter (not shown), and a beam splitter 140.

The aperture 110 may be formed as an opaque plate with an opening through which light passes, and a light beam emitted from the light source 100 may be converted into a form suitable for photographing a plurality of overlay targets T.

The aperture 110 may include one or more of an aperture stop which controls an amount of light, and a field stop which adjusts an image focusing range. As shown in FIG. 1, the aperture may be formed between the light source 100 and the beam splitter 140. Although not shown, the aperture may be formed between the beam splitter 140 and the lens unit 200.

The spectral filter 120 may adjust a central wavelength and a bandwidth of the beam emitted from the light source 100 so as to be suitable for acquiring an image of the first overlay key and the second overlay key formed in the plurality of overlay targets T. For example, the spectral filter 120 may be composed of at least one of a filter wheel, a linear translation device, a flipper device, and combinations thereof.

The beam splitter 140 transmits a portion of the beam that comes from the light source 100 and passes through the aperture 110 therethrough, and reflects a portion of the beam therefrom to split the beam from the light source 100 into two sub-beams.

As shown in FIG. 1, the lens unit 200 may include an objective lens 210 that focuses the light on a measurement position of one of the plurality of overlay targets T, and a lens focus actuator 220 that adjusts a distance between the objective lens 210 and the plurality of overlay targets T.

The objective lens 210 may focus the beam reflected from the beam splitter 140 on a measurement position where the first overlay key and the second overlay key of the wafer W are formed and collect the beam reflected therefrom.

The objective lens 210 may be installed in the lens focus actuator 220.

The lens focus actuator 220 may adjust the distance between the objective lens 200 and the wafer W so that a focal plane is located at the plurality of overlay targets T.

The lens focus actuator 220 may adjust a focal length by vertically moving the objective lens 200 toward the wafer W under control of the controller 400.

When measuring the wafer W using the lens unit 200, an area where the image is captured changes as the objective lens 210 is controlled. In this case, the area where the wafer W may be captured with the objective lens 210 is a FOV (field of view). That is, the FOV (field of view) may be adjusted with the objective lens 210, and the focus may be adjusted with the lens focus actuator 220.

Moreover, the lens unit 200 may measure the global mark GM to check a correct position of the wafer W.

As shown in FIG. 1, the detector 300 may acquire a focus image at the measurement position through the beam reflected from the measurement position.

The detector 300 may capture the beam having been reflected from the plurality of overlay targets T and then having passing through the beam splitter 140 and acquire an image of the first overlay key and the second overlay key based on the capture beam.

The detector 300 may include an optical detector capable of measuring the beam reflected from the plurality of overlay targets T. For example, the optical detector may include a charge-coupled device (CCD) that extracts an image by converting light into electric charges, a complementary metal-oxide-semiconductor sensor (CMOS) as one of integrated circuits, a photomultiplier tube (PMT) that measures light, an APD (avalanche photodiode) array as a photodetector, or various sensors that generate or capture images.

The detector 300 may include a filter, a polarizer, and a beam block, and may further include any optical collection component (not shown) for collecting the light collected by the objective lens 210.

Moreover, the detector 300 may measure the global mark GM to check the correct position of the wafer W.

The stage 500 may be configured to seat the wafer W thereon and fix the wafer W thereto, and to move horizontally and rotate such that the fixed lens unit 200 on top thereof may measure the plurality of overlay targets T of the wafer W.

As shown in FIG. 1, the controller 400 may control a direction of the light emitted from the light source 100. The controller may control the lens unit 200 to focus the light on the plurality of overlay targets T and collect the reflected beam therefrom. The controller may control the detector 300 to obtain a focus image measured through the reflected beam collected by the lens unit 200, and may control the movement of the stage 500 so that the overlay target is located under the lens unit 200.

Moreover, the controller 400 may control the lens unit 200, the detector 300, and the stage 500 to measure a preset collection-purposed overlay target A among the plurality of overlay targets T. The controller 400 may collect a target coordinate spaced apart from a center C of the FOV of the lens unit 200, calculate a correction value through the target coordinate, apply the correction value to move the stage 500, and control the lens unit 200, the detector 300, and the stage 500 to measure at least one application-purposed overlay target B among the plurality of overlay targets T.

Specifically, the controller 400 may include a light source actuator 410, a lens actuator 420, a stage actuator 430, a storage 440, an offset calculator 450, a correction value calculator 460, and an overlay measurement unit 470.

As shown in FIG. 2, the light source actuator 410 may control the direction of the light emitted from the light source 100, and the lens actuator 420 may control an operation of the lens focus actuator 220 so that the light is focused on the plurality of overlay targets T and a focus image is obtained.

As shown in FIG. 2, the stage actuator 430 may control the movement of the stage 500 so that the overlay target is located under the lens unit 200. Specifically, the stage actuator 430 may control the movement and rotation of the wafer W so that the positions of the plurality of global marks GM and the plurality of overlay targets T formed on the wafer W may be measured by the lens unit 200.

Specifically, the stage actuator 430 may control the movement of the stage 500 so as to detect the collection-purposed overlay target A which is used to collect offset data in the overlay measurement, and the application-purposed overlay target B subjected to application of the offset data in the overlay measurement, among the plurality of overlay targets T. For example, according to a preset classification of the plurality of overlay targets T, the stage actuator 430 may move the stage 500 to a set position in the collection-purposed overlay target A, but may apply the correction value to be described later to a set position to move the stage 500 in the application-purposed overlay target B.

In this regard, among the plurality of overlay targets T, the collection-purposed overlay target A and the application-purposed overlay target B may be preset and may vary on a wafer W basis.

Moreover, the stage actuator 430 may control the stage 500 to move to a preset measurement position in the collection-purposed overlay target A and the application-purposed overlay target B. In this regard, the preset measurement position may be displaced around a center of the overlay target. However, in the actual movement, due to an error occurring during movement, the center C of the FOV (field of view) deviates from a center of the overlay target. Thus, the correction value to be described later may be applied to control the movement of the stage 500.

When measuring the collection-purposed overlay target A, the stage actuator 430 may control the stage 500 such that the collection-purposed overlay target A formed at the site closest to the center of the wafer W to the collection-purposed overlay target A formed at the site farthest from the center of the wafer W may be measured sequentially.

Moreover, when measuring the application-purposed overlay target B, the stage actuator 430 may control the stage 500 such that the application-purposed overlay target B formed at the site closest to the center of the wafer W to the application-purposed overlay target B formed at the site farthest from the center of the wafer W may be measured sequentially.

As shown in FIG. 2, the storage 440 may store therein an image of the collection-purposed overlay target A and an image of the application-purposed overlay target B as acquired by the detector 300.

For example, the stage actuator 430 may control the stage such that the plurality of overlay targets T formed on the wafer W is positioned under the lens unit 200. Accordingly, the lens actuator 420 may control the objective lens 210 and the lens focus actuator 220 to obtain the image of the plurality of overlay targets T measured at each position and store the image in the storage 440.

In this regard, the images of the plurality of overlay targets T stored in the storage 440 may be classified into the image of the collection-purposed overlay target A and the image of the application-purposed overlay target B.

The image of the collection-purposed overlay target A refers to an image measured without the application of the correction value calculated by the correction value calculator 460, while the image of the application-purposed overlay target B refers to an image measured with the application of the correction value calculated by the correction value calculator 460.

The offset calculator 450 may calculate a spacing between a position of the overlay target image obtained by measuring the plurality of overlay targets T using the lens unit 200 and the center C of the FOV (field of view) and a rotation direction of the position relative to the center C.

Specifically, the offset calculator 450 may calculate a distance between a target coordinate of the collection-purposed overlay target A and the center C of the FOV of the lens unit 200. For example, the offset calculator 450 may set the center C of the FOV (field of view) to a center coordinate (0, 0), and may calculate a distance between the target coordinate (x and y) of the measured image of the collection-purposed overlay target A and the center coordinate (0, 0).

Moreover, the offset calculator 450 may calculate an angle by which a target coordinate (x and y) of the collection-purposed overlay target A as measured is rotated relative to the center C of the FOV. For example, the rotation angle may be obtained by calculating an angle between an X-axis symmetry line of the collection-purposed overlay target A and the X-axis of the FOV (field of view).

Moreover, the offset calculator 450 may calculate a distance between a target coordinate of the application-purposed overlay target B and the center C of the FOV of the lens unit 200. For example, the offset calculator 450 may set the center C of the FOV (field of view) to a center coordinate (0, 0), and may calculate a distance between the target coordinate (x and y) of the measured image of the application-purposed overlay target B and the center coordinate (0, 0).

Moreover, the offset calculator 450 may calculate an angle by which a target coordinate (x and y) of the application-purposed overlay target B as measured is rotated relative to the center C of the FOV. For example, the rotation angle may be obtained by calculating an angle between an X-axis symmetry line of the application-purposed overlay target B and the X-axis of the FOV (field of view).

The correction value calculator 460 may calculate the correction value based on the target coordinate. For example, when the target coordinate is calculated as (x and y) by the offset calculator 450, (−x and −y) may be calculated as the correction value by the correction value calculator 460.

Moreover, when detecting the plurality of overlay targets T, the correction value calculator 460 may calculate an average of the distances between the plurality of target coordinates as repeatedly measured by the detector 300 and the center C of the FOV of the lens unit as the correction value.

The controller 400 may calculate a reference coordinate of the wafer W based on the global mark GM, and apply the reference coordinate to calculate the correction value. The misalignment between the stage 500 and the wafer W may be corrected based on the correction value.

Specifically, a state in which the wafer W is seated on the stage 500 may be checked based on the global mark GM measured by the lens unit 200 and the detector 300. For example, when the wafer W is seated on an upper surface of the stage 500 in a partially misaligned manner or rotated manner, the global mark GM measured by the lens unit 200 may be measured in a partially misaligned manner or rotated manner.

Based on the global mark GM, a distance and an angle by which the wafer W deviates relative to the stage 500 may be calculated, and a reference value that may correct the deviation may be calculated. When moving the stage 500 to measure the plurality of overlay targets T, the reference value may be applied to ensure that the overlay target of the wafer W is located at the center C of the field of view (FOV) of the lens unit 200.

The overlay measurement unit 470 may collect offset values and may measure overlay values of all targets based on images of the plurality of overlay targets T including the collection-purposed overlay target A that is used to measure the overlay and the application-purposed overlay target B that is used to measure the overlay after applying the correction value.

Moreover, in order that the user may monitor a series of processes performed in the controller 400, the overlay measurement apparatus may include a display unit (not shown). The overlay measurement apparatus may include an input unit (not shown) via which the user may directly control the series of processes.

That is, on the display unit, the storage 440, the offset calculator 450, the correction value calculator 460, and the overlay measurement unit 470 and the data and the images calculated thereby may be checked by the user. Via the input unit, the user may directly control the light source actuator 410, the lens actuator 420, and the stage actuator 430, or directly select, change, and calculate the images and the correction values of the plurality of overlay targets T.

In addition, the overlay measurement apparatus may include a memory that stores therein instructions, programs, logic, etc. to control an operation of each of the components of the overlay measurement apparatus by the controller 400. Some components may be added, changed, or deleted as needed.

In other words, the overlay measurement apparatus in accordance with the present disclosure may calculate the offset value from the measurement position in some preset collection-purposed overlay targets A among the plurality of overlay targets T formed on the wafer W, and may apply the offset value as the correction value to remaining application-purposed overlay targets B among the plurality of overlay targets T, thereby correcting the error that occurs every time the stage 500 moves, reducing the error that occurs in each measurement, and, moreover, and saving a travel time taken for the stage to move to the measurement position.

In particular, the offset value may be calculated from the collection-purposed overlay target A without the application of the correction. Thus, an average offset value according to the movement of the stage 500 may be calculated. The measurement time may be reduced by applying the correction value only to the application-purposed overlay target B.

Figure 8:
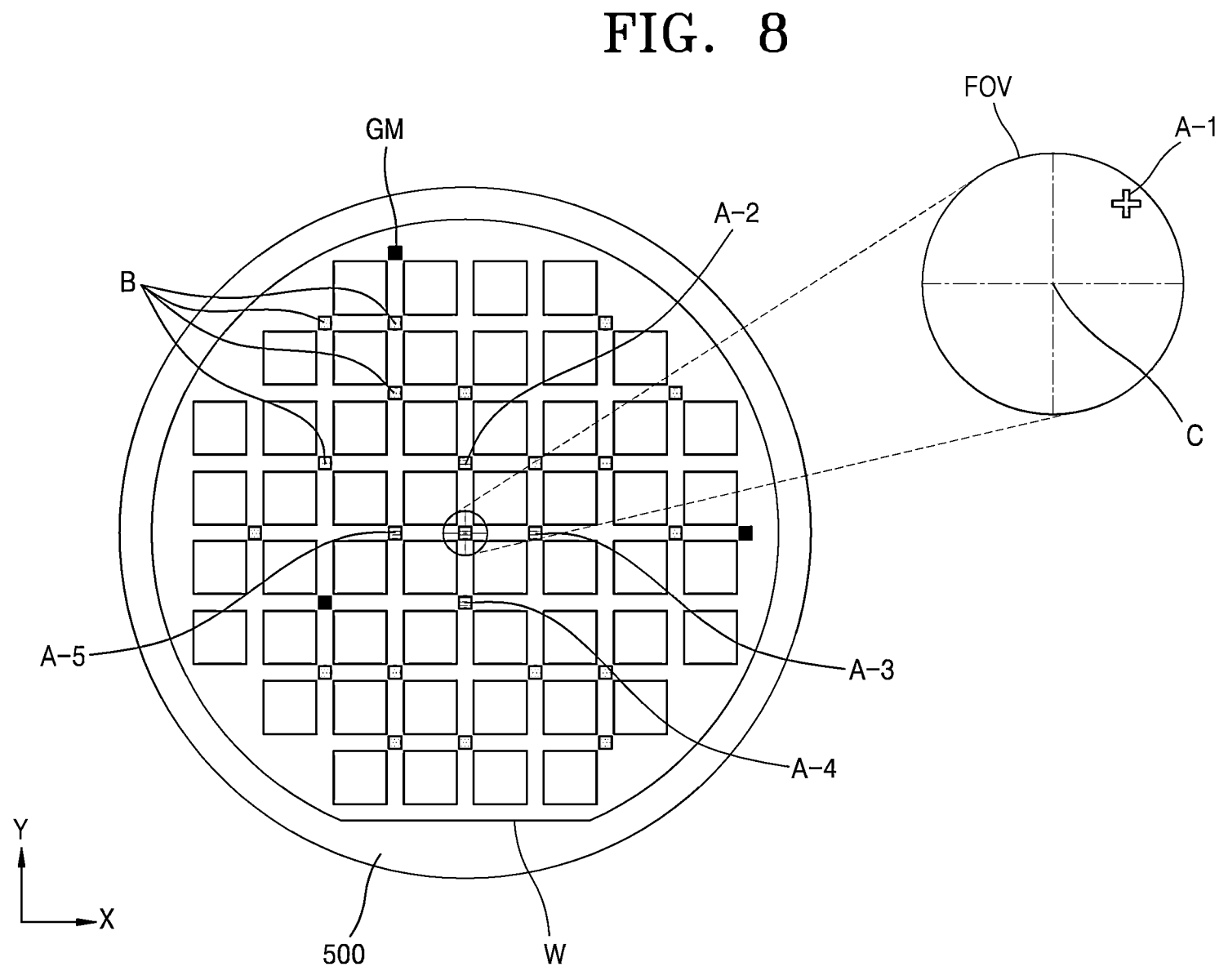
Figure 9:
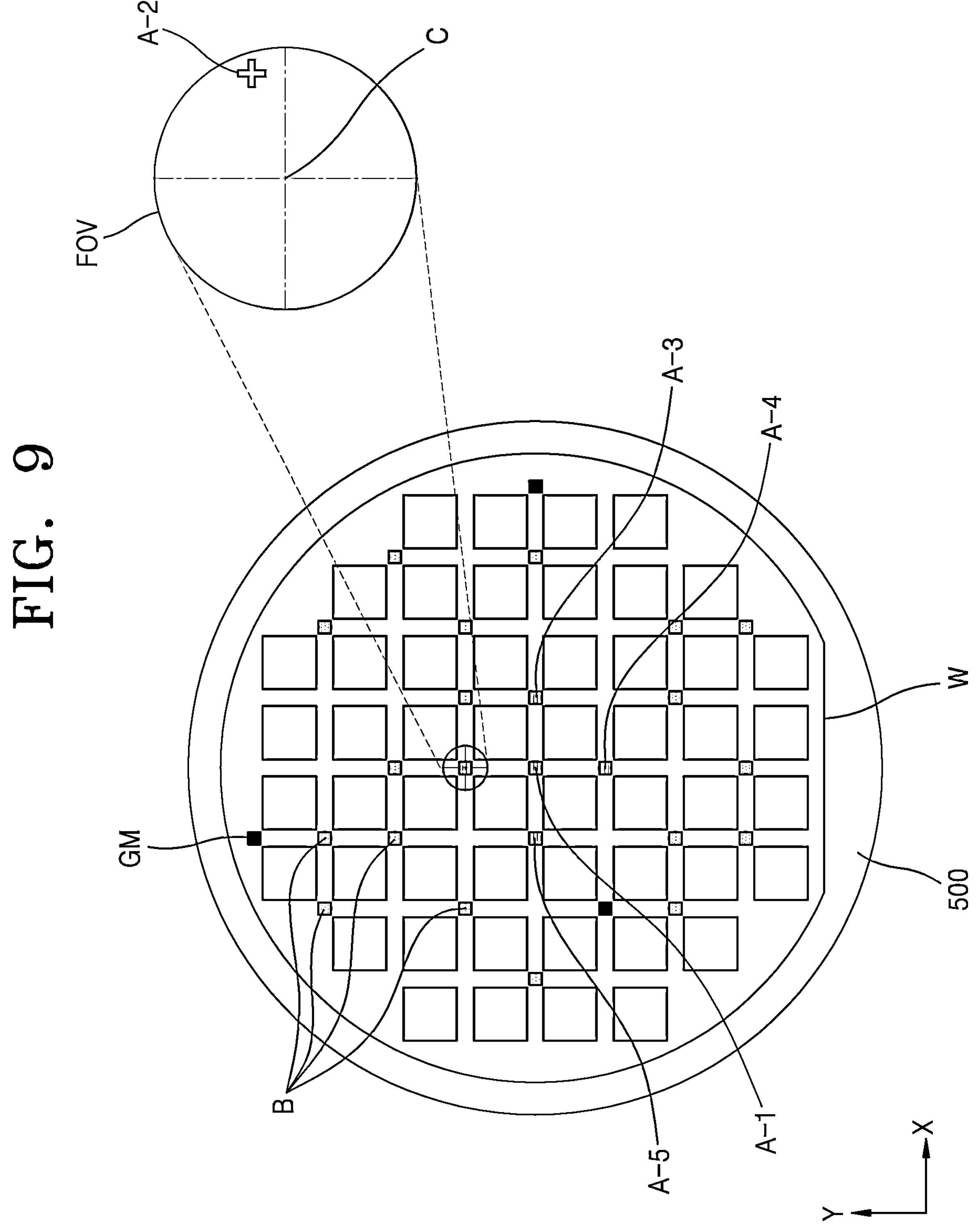
Figure 10:
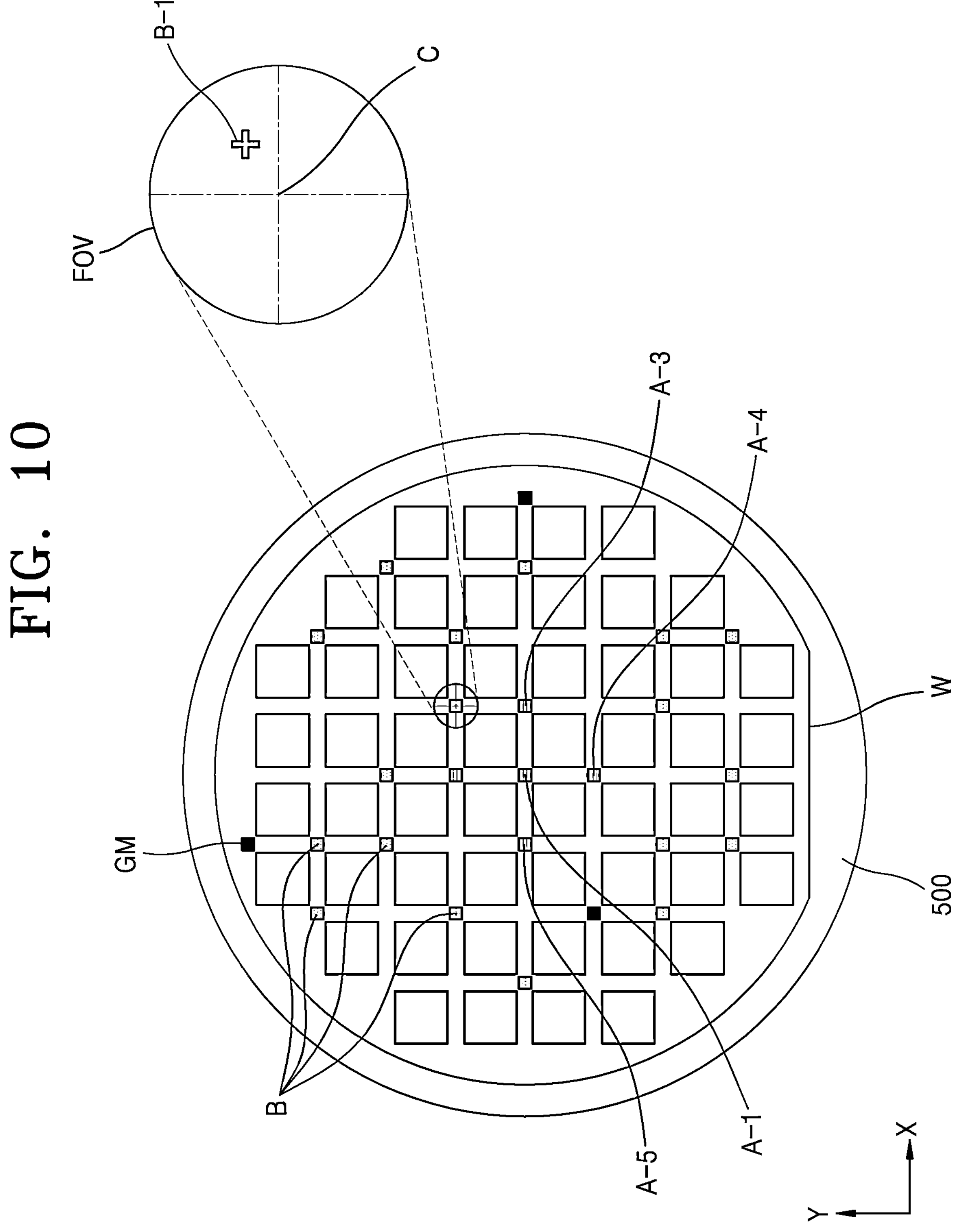
Figure 11:
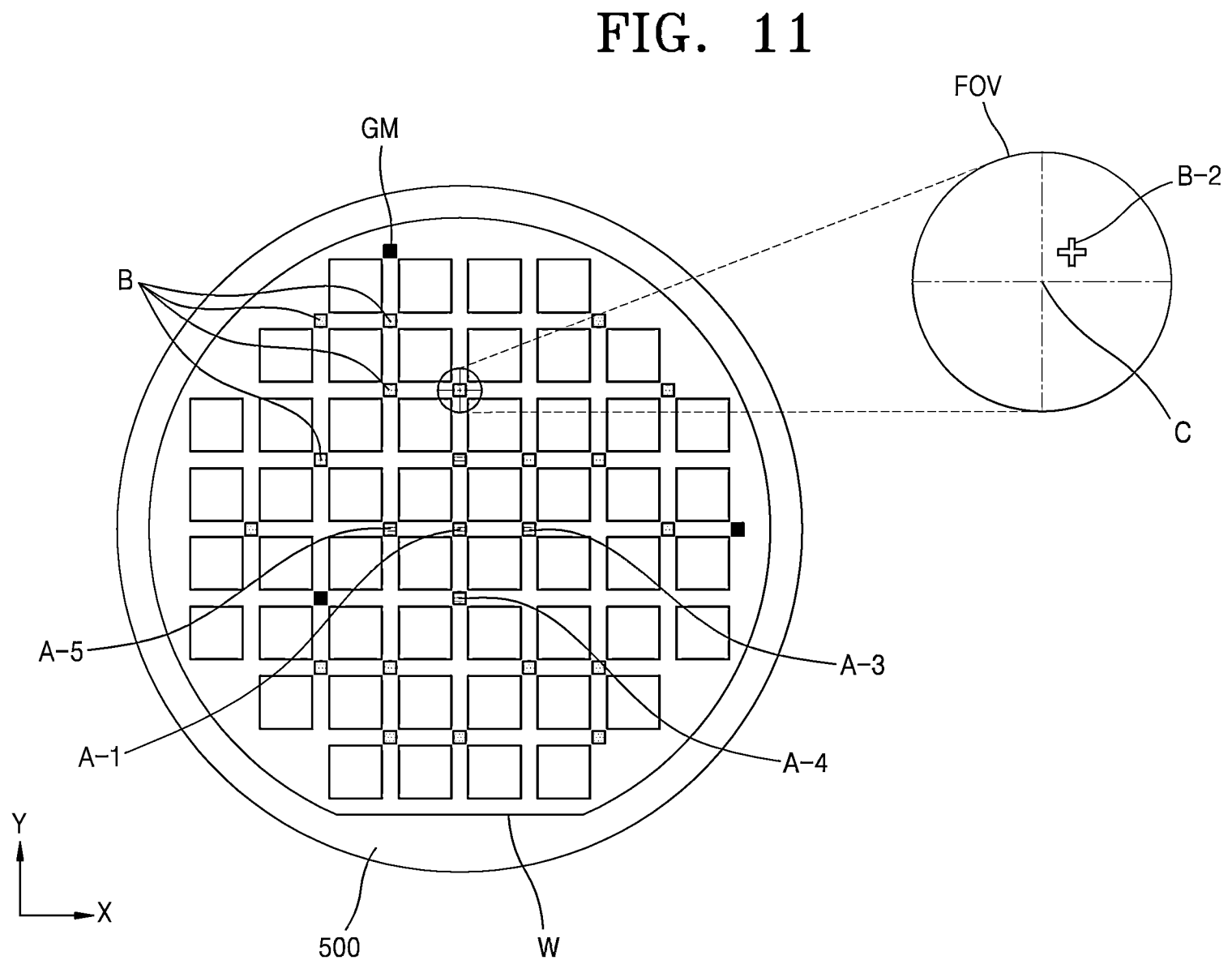

FIGS. 3 to 6 are diagrams showing an overlay measurement method according to various embodiments of the present disclosure. FIG. 7 is a top view showing a state in which the wafer W on which the global mark GM and the plurality of overlay targets T have been formed is seated on the stage 500. FIG. 8 and FIG. 9 are top views showing a collection-purposed overlay target measurement step S100 according to an embodiment of the present disclosure. FIG. 10 and FIG. 11 are top views showing an application-purposed overlay target measurement step S300 according to an embodiment of the present disclosure.

The overlay measurement method according to an embodiment of the present disclosure may include the collection-purposed overlay target measurement step S100, a correction value calculation step S200, and the application-purposed overlay target measurement step S300.

Figure 3:
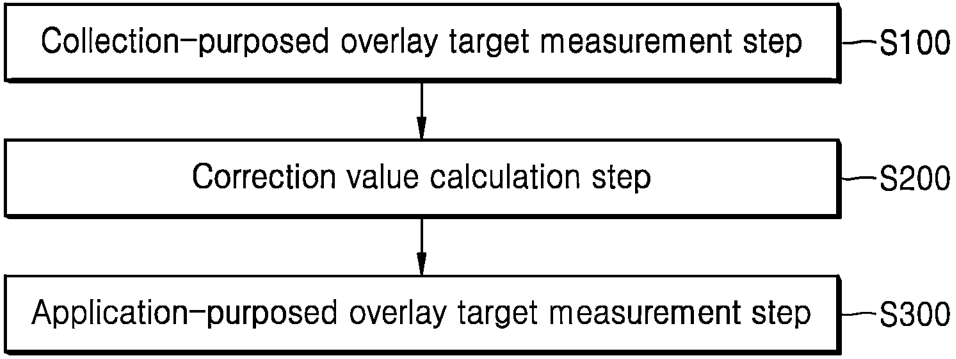
FIGS. 3 to 6 are drawings showing an overlay measurement method according to various embodiments of the present disclosure.

As shown in FIG. 3, the collection-purposed overlay target measurement step S100 includes moving thee 500 on which the wafer W is seated; measuring at least one collection-purposed overlay target A among the plurality of overlay targets T using the lens unit 200 and the detector 300; collecting a target coordinate of the collection-purposed overlay target A spaced from the center C of the field of view of the lens unit 200; and measuring an overlay value of the collection-purposed overlay target A.

Figure 4:
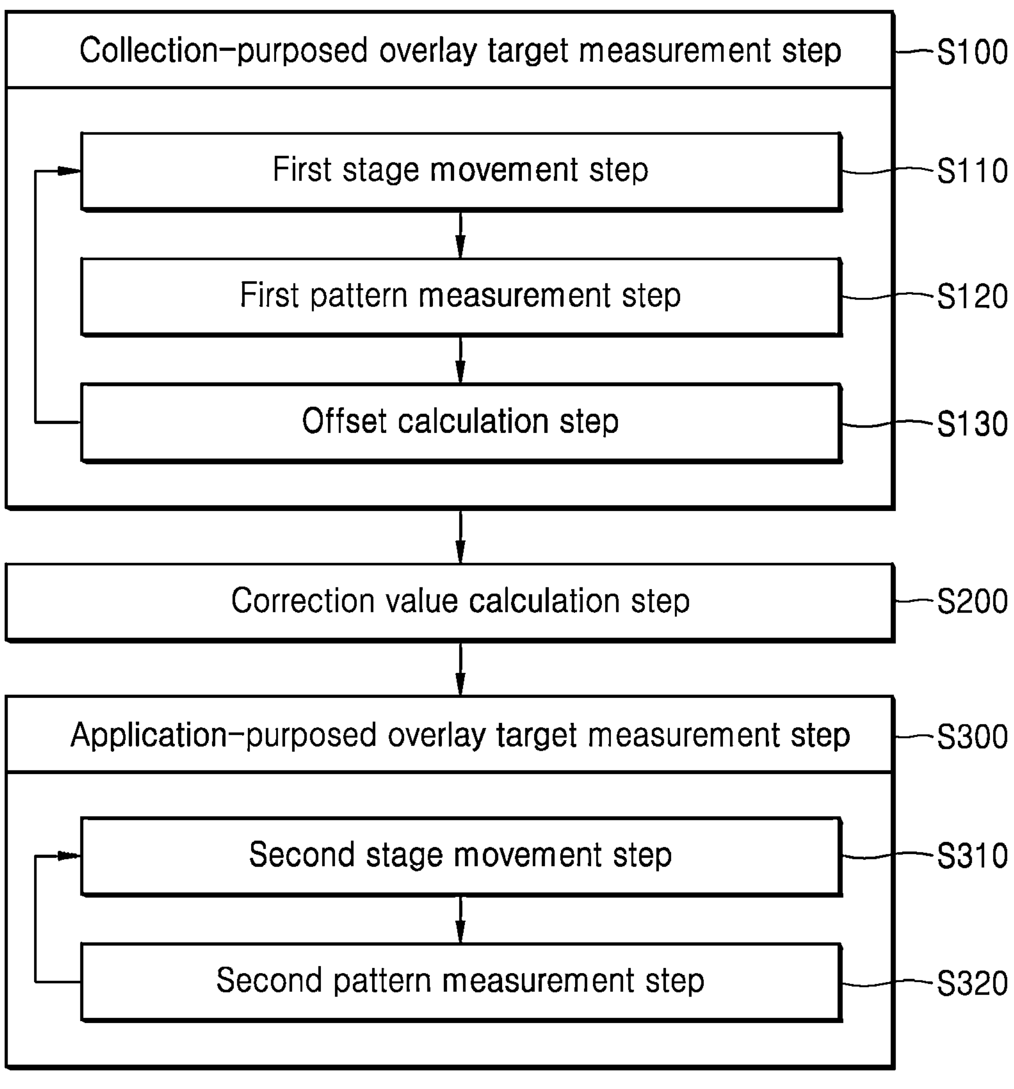
Figure 5:
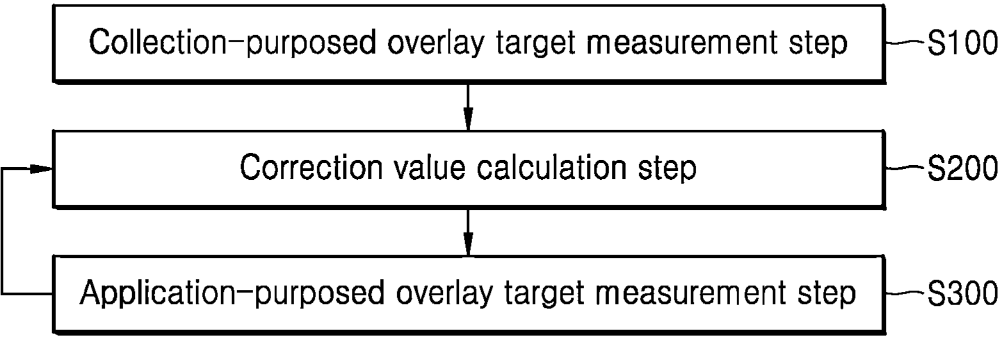

Specifically, as shown in FIG. 4, the collection-purposed overlay target measurement step S100 may include a first stage movement step S110, a first pattern measurement step S120, and an offset calculation step S130.

The first stage movement step S110 is a step of moving the stage 500 on which the wafer W is placed so that the lens unit 200 is positioned on top of the site where the collection-purposed overlay target A is formed. The first pattern measurement step S120 is a step of measuring the collection-purposed overlay target A using the lens unit 200 and the detector 300.

The offset calculation step S130 is a step of calculating the distance between the center C and the target coordinate of the collection-purposed overlay target A spaced apart from the center C.

For example, in the first stage movement step S110, the stage may be moved so that a first collection-purposed overlay target A-1 is located at the center C of the FOV of the lens unit 200. In this regard, the movement of the stage 500 may be controlled so that a center of the first collection-purposed overlay target A-1 coincides with the center C of the FOV (field of view). However, actually, due to the error occurring during the movement, the center C of the FOV (field of view) may not coincide with the center of the overlay target.

Therefore, this error may be measured in the first pattern measurement step S120 and calculated in the offset calculation step S130. For example, as shown in FIG. 9, the measured first collection-purposed overlay target A-1 may be spaced apart from the center C of the FOV (field of view) of the lens unit. The target coordinate of the first collection-purposed overlay target A-1 at this time may be calculated as (x and y).

In this regard, the collection-purposed overlay target measurement step S100 may measure the first collection-purposed overlay target A-1, a second collection-purposed overlay target A-2 to an n-th collection-purposed overlay target A-n among the plurality of overlay targets T, and may collect a first target coordinate of the first collection-purposed overlay target A-1, a second target coordinate of the second collection-purposed overlay target A-2 to an n-th target coordinate of the n-th collection-purposed overlay target A-n spaced apart from the center C of the field of view of the lens unit 200.

The collection-purposed overlay target measurement step S100 may repeatedly measure a plurality of collection-purposed overlay targets A. For example, as shown in FIG. 8, in the first stage movement step S110, the stage 500 may be moved such that the first collection-purposed overlay target A-1 is located under the lens unit 200. In the first pattern measurement step S120, the first collection-purposed overlay target A-1 may be measured. Then, in the offset calculation step S130, a distance between the center C of the FOV and the first target coordinate of the first collection-purposed overlay target A-1 spaced from the center C may be calculated.

The first target coordinate calculated in this way may be stored in the memory, and the second collection-purposed overlay target A-2 formed in a different position from that of the first collection-purposed overlay target A-1 may be measured in the same way as shown in FIG. 9. Thus, a second target coordinate of the second collection-purposed overlay target A-2 may be calculated and stored in the memory.

In this regard, the collection-purposed overlay targets A among the plurality of overlay targets T may be preset and the presetting may vary on a wafer basis.

Moreover, the measurement order of the collection-purposed overlay targets A may be preset, preferably, in a direction from a center of the wafer W toward an edge thereof.

For example, in the collection-purposed overlay target measurement step S100, the first collection-purposed overlay target A-1, the second collection-purposed overlay target A-2 to the n-th collection-purposed overlay target A-n may be arranged in an increasing order of a spacing thereof from the center of the wafer W.

For example, as shown in FIG. 8, the overlay target T formed at the center of the wafer W is set to the first collection-purposed overlay target A-1. As shown in FIG. 9, the overlay target T closest to the first collection-purposed overlay target A-1 may be set to the second collection-purposed overlay target A-2.

Therefore, the first collection-purposed overlay target A-1 and the second collection-purposed overlay target A-2 may be measured, and then a third collection-purposed overlay target A-3 and a fourth collection-purposed overlay target A-4, and a fifth collection-purposed overlay target A-5 may be measured.

That is, in the collection-purposed overlay target measurement step S100, the stage 500 moves to the position where the first collection-purposed overlay target A-1 located at the site closest to the center of the wafer W is formed, and the first collection-purposed overlay target A-1 may be measured. Then, the stage 500 moves to the position where the second collection-purposed overlay target A-2 located at the site second closest to the center of the wafer W is formed, and the second collection-purposed overlay target A-1 may be measured. Accordingly, the first target coordinate and the second target coordinate which are measured to have different values due to the error generating during initial placement of the wafer on the stage and the error generating when moving the stage 500 may be calculated.

As shown in FIG. 3, the correction value calculation step S200 is a step in which the correction value is calculated based on the target coordinate, in order to correct the error that occurs when the stage 500 moves.

In repeatedly measuring the plurality of collection-purposed overlay targets A, the correction value calculation step S200 may include calculating, as the correction value, an average of distances respectively between a plurality of target coordinates repeatedly measured in the collection-purposed overlay target measurement step S100 and the center C of the field of view of the lens unit 200.

In other words, the correction value may be calculated by six param modeling a PR (pattern recognition) offset of the collection-purposed overlay target A as repeatedly measured. For example, using the PR offset on the wafer, changed translation, rotation, and range scale components may be calculated.

That is, an average value of the first target coordinate, the second target coordinate, and the n-th target coordinate may be calculated as the correction value which in turn may be applied to the application-purposed overlay target measurement step S300, which will be described later.

As shown in FIG. 3, the application-purposed overlay target measurement step S300 may include applying the correction value to move the stage 500; measuring at least one application-purposed overlay target B among the plurality of overlay targets T using the lens unit 200 and the detector 300; and measuring an overlay value of the application-purposed overlay target B.

Specifically, as shown in FIG. 4, the application-purposed overlay target measurement step S300 may include a second stage movement step S310 and a second pattern measurement step S320.

The second stage movement step S310 is a step of applying the correction value to move the stage 500 so that the lens unit 200 is located on top of a site where the application-purposed overlay target B is formed. The second pattern measurement step S320 is a step of measuring the application-purposed overlay target B using the lens unit 200 and the detector 300.

For example, in the second stage movement step S310, the stage may be moved so that the application-purposed overlay target B is located at the center of the FOV (field of view). In this regard, the stage 500 may be moved under the application of the correction value calculated in the correction value calculation step S200, and then, the second pattern measurement step S320 may be performed.

Accordingly, a first application-purposed overlay target B-1 may be measured so as to be spaced away from the center C of the FOV. In this regard, a distance by which the first application-purposed overlay target B-1 is spaced from the center C of the FOV may be smaller than the distance by which the collection-purposed overlay target A is spaced from the center C of the FOV.

For example, the distance by which the first application-purposed overlay target B-1 to which the correction value is applied is spaced from the center C of the FOV as shown in FIG. 10 may be smaller than the distance by which the collection-purposed overlay target A to which the correction value is not applied is spaced from the center C of the FOV as shown in FIG. 8 and FIG. 9. This is because after the correction value has been applied for moving the stage 500, the first application-purposed overlay target B-1 is measured.

That is, the offset value may be calculated from the preset collection-purposed overlay target A among the overlay targets T on which numerous overlay patterns formed on the wafer W are formed, respectively, and then may be applied, as the correction value, to remaining application-purposed overlay targets B among the overlay targets T. Thus, an overall overlay measurement speed on the wafer W may be accelerated such that a process time may be reduced.

In this regard, the application-purposed overlay target measurement step S300 may be performed repeatedly to measure the first application-purposed overlay target B-1, a second application-purposed overlay target B-2 to an n-th application-purposed overlay target B-n among the plurality of overlay targets T.

The application-purposed overlay target measurement step S300 may be repeatedly perform to measure a plurality of application-purposed overlay targets B. For example, as shown in FIG. 4, in the second stage movement step S310, the stage 500 may be moved so that the first application-purposed overlay target B-1 is located under the lens unit 200, and in the second pattern measurement step S320, the first application-purposed overlay target B-1 may be measured.

Then, in the second stage movement step S310, the stage 500 may be moved so that the second application-purposed overlay target B-2 is located under the lens unit 200, and in the second pattern measurement step S320, the second application-purposed overlay target B-2 may be measured.

In this regard, in the second stage movement step S310, the correction value may be applied in moving the stage 500 for measuring each of the first application-purposed overlay target B, the second application-purposed overlay target B, and the n-th application-purposed overlay target B.

Alternatively, after the application-purposed overlay target measurement step S300, the correction value calculation step S200 may be repeated.

Specifically, in the application-purposed overlay target measurement step S300 may include calculating a distance between an additional target coordinate of the application-purposed overlay target B and the center C of the field of view. The correction value calculation step 200 may include calculating the correction value, further based on the additional target coordinate.

That is, the correction value may be calculated by applying both the target coordinate calculated in the collection-purposed overlay target measurement step S100 and the additional target coordinate calculated in the application-purposed overlay target measurement step S300.

Moreover, after the application-purposed overlay target measurement step S300, the correction value calculation step S200 may be repeated such that the additional target coordinates are accumulated, and accordingly, the correction value is continuously updated. Thus, as the overlay measurement continues, the additional target coordinate may gradually converge to the center C of the FOV.

For example, as shown in FIGS. 10 and 11, the spacing between the second application-purposed overlay target B-2 and the center of the field of view C may be smaller than the spacing between the first application-purposed overlay target B-1 and the center of the field of view C.

In this regard, the application-purposed overlay targets B among the plurality of overlay targets T may be preset and the presetting may vary on a wafer basis.

Figure 6:
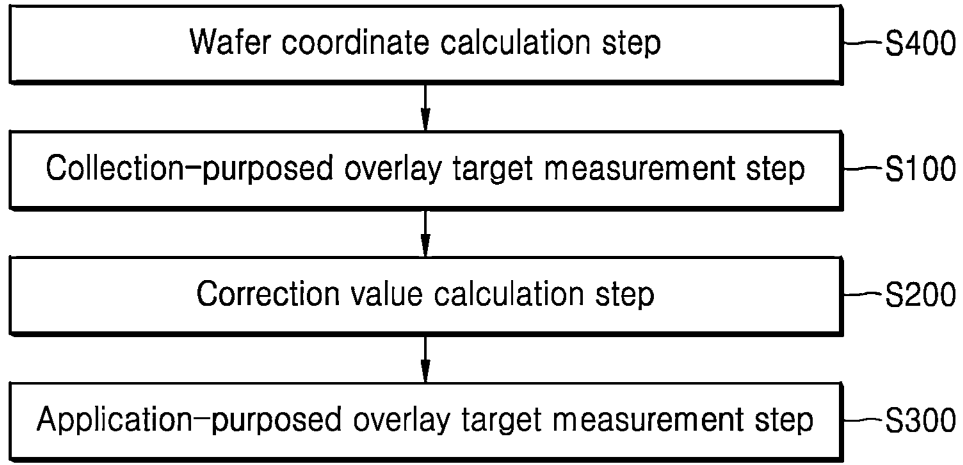
Figure 7:
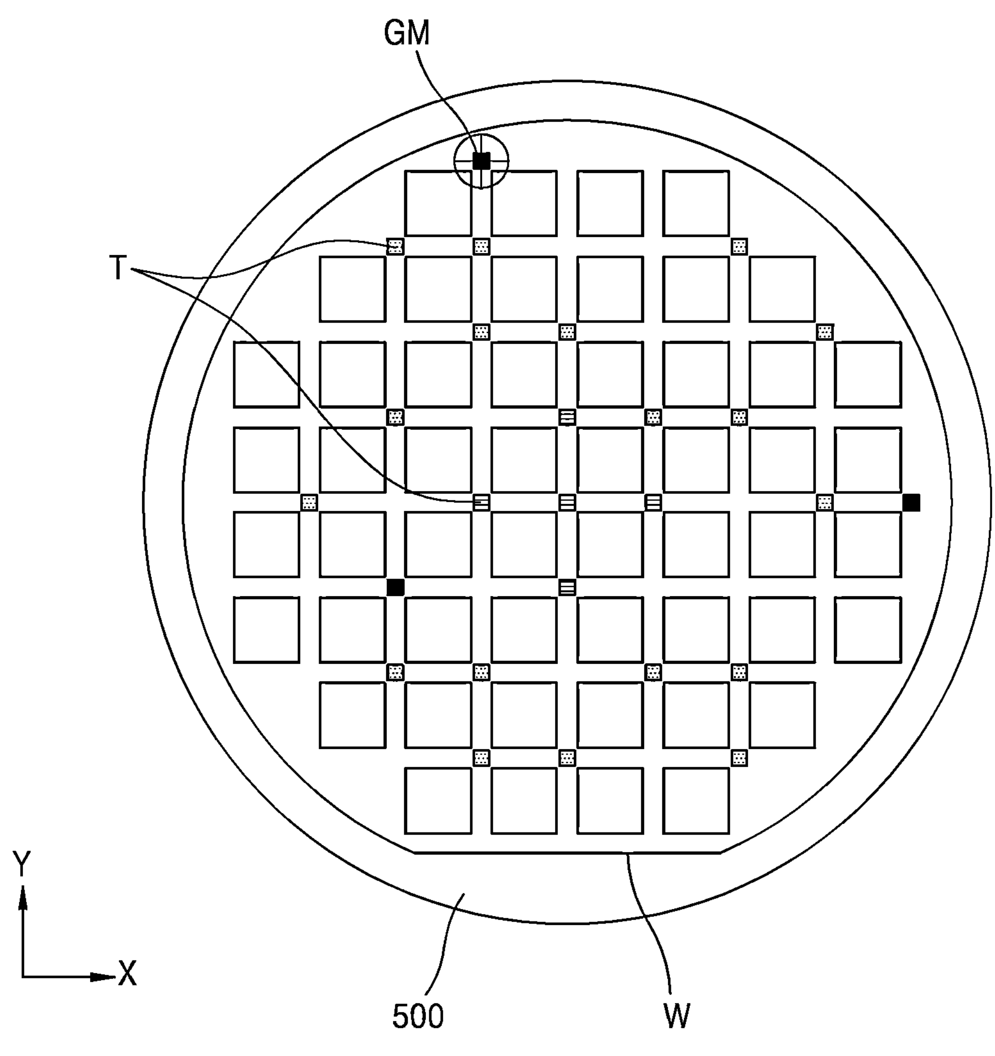
FIG. 7 is a top view showing a state in which a wafer on which a global mark and a plurality of overlay targets according to an embodiment of the present disclosure have been formed is seated on a stage.

As shown in FIG. 6, the overlay measurement method according to one embodiment of the present disclosure may further include, before the collection-purposed overlay target measurement step S100, a wafer coordinate calculation step S400 in which the reference coordinate of the wafer W is calculated based on a measuring result of the global mark GM formed on the wafer W using the lens unit 200 and the detector 300.

The wafer coordinate calculation step S400 is a step to check the correct position of the wafer W after the wafer is seated on the upper surface of the stage 500.

For example, when the wafer W is not seated in the correct position on the top of the stage 500, all of the measurement positions of the plurality of overlay targets T as measured later may be misaligned. Therefore, in the wafer coordinate calculation step S400, the position of the wafer W may be checked, and if the wafer W is not in the correct position, the reference coordinate may be stored and applied to the plurality of overlay targets T as measured later.

That is, in the correction value calculation step S200, a final correction value may be calculated by applying the reference coordinate to the correction value in order to correct the misalignment between the stage 500 and the wafer W.

According to the above-mentioned, the overlay measurement apparatus and overlay measurement method in accordance with the present disclosure may measure the offset value according to the stage movement in the initial measurement, and apply this offset value to subsequent measurements to correct for wafer misalignment and to correct the error that occurs when the stage moves, and to reduce the error that occur in each measurement, thereby increasing measurement accuracy, saving a time taken for the site where the overlay pattern is formed to be displaced to the measurement position, and a distance therebetween, and reducing operator man-hours. Moreover, consistent results may be obtained via data-based automatic optimization of an optimization result that is greatly influenced by the individual worker's abilities.

The present disclosure has been described with reference to the embodiment as shown in the drawings, but the embodiment is merely an example, and those skilled in the art will understand that various modifications and equivalent other embodiments may be made therefrom. Therefore, the true scope of the present disclosure should be determined based on the technical spirit of the attached patent claims.

What is claimed is:

1. An overlay measurement apparatus comprising:

a light source configured to direct light to a plurality of overlay targets formed on a wafer;

a lens unit including:

an objective lens configured to focus the light on a measurement position of one of the plurality of overlay targets; and a lens focus actuator configured to adjust a distance between the objective lens and a surface of the wafer at the measurement position;

a detector configured to acquire a focus image at the measurement position based on a beam reflected from the measurement position;

a stage on which the wafer is seated; and a controller configured to:

control the lens unit, the detector, and the stage to measure a preset collection-purposed overlay target among the plurality of overlay targets, the collection-purposed overlay target being used to generate the correction value;

collect a target coordinate of the collection-purposed overlay target spaced apart from a center of a field of view (FOV) of the lens unit;

calculate a correction value based on the target coordinate;

move the stage under application of the correction value; and control the lens unit, the detector, and the stage to measure at least one application-purposed overlay target among the plurality of overlay targets, after application of the correction value to movement of the stage, wherein the controller includes:

a stage actuator configured to control the movement of the stage;

a storage for storing therein an image of the collection-purposed overlay target and an image of the application-purposed overlay target obtained using the detector;

an offset calculator configured to calculate a distance between the target coordinate of the collection-purposed overlay target and the center of the field of view of the lens unit; and a correction value calculator configured to calculate the correction value based on the target coordinate, wherein the correction value calculator is configured to calculate the correction value using distances between a plurality of the target coordinates repeatedly measured by the detector and the center of the field of view of the lens unit.

2. The overlay measurement apparatus of claim 1 wherein in measuring the collection-purposed overlay target, the stage actuator is configured to control the stage such that the collection-purposed overlay targets are measured sequentially in an order from the collection-purposed overlay target formed at a site closest to a center of the wafer to the collection-purposed overlay target formed at a site farthest from the center of the wafer.

3. The overlay measurement apparatus of claim 1, wherein the correction value calculator is configured to calculate, as the correction value, an average of distances respectively between a plurality of the target coordinates and the center of the field of view of the lens unit.

4. The overlay measurement apparatus of claim 1, wherein the offset calculator is configured to calculate a distance between a target coordinate of the application-purposed overlay target and the center of the field of view of the lens unit.

5. An overlay measurement method comprising:

a collection-purposed overlay target measurement step including:

moving a stage on which a wafer is seated;

measuring at least one collection-purposed overlay target among a plurality of overlay targets using a lens unit and a detector, the collection-purposed overlay target being used for generating the correction value;

collecting a target coordinate of the collection-purposed overlay target spaced from a center of a field of view of the lens unit; and measuring an overlay value of the collection-purposed overlay target;

a correction value calculation step of calculating a correction value based on the target coordinate, wherein an error occurring due the movement of the stage is corrected based on the correction value; and an application-purposed overlay target measurement step including:

applying the correction value to move the stage;

measuring at least one application-purposed overlay target among the plurality of overlay targets using the lens unit and the detector, after applying the correction value to movement of the stage; and measuring an overlay value of the application-purposed overlay target, wherein the correction value calculation step of calculating the correction value using distances between a plurality of target coordinates repeatedly measured in the collection-purposed overlay target measurement step and the center of the field of view of the lens unit.

6. The overlay measurement method of claim 5, wherein the collection-purposed overlay target measurement step includes:

a first stage moving step of moving the stage on which the wafer is seated so that the lens unit is positioned on top of a site where the collection-purposed overlay target is formed;

a first pattern measurement step of measuring the collection-purposed overlay target using the lens unit and the detector; and an offset calculation step of calculating a distance between the target coordinate of the collection-purposed overlay target and the center of the field of view of the lens unit.

7. The overlay measurement method of claim 5, wherein the collection-purposed overlay target measurement step includes:

measuring a first collection-purposed overlay target, a second collection-purposed overlay target to an n-th collection-purposed overlay target among the plurality of overlay targets; and collecting a first target coordinate of the first collection-purposed overlay target, a second target coordinate of the second collection-purposed overlay target to an n-th target coordinate of the n-th collection-purposed overlay target spaced apart from the center of the field of view of the lens unit.

8. The overlay measurement method of claim 7, wherein the first collection-purposed overlay target, the second collection-purposed overlay target to the n-th collection-purposed overlay target are arranged in an increasing order of a spacing thereof from a center of the wafer, wherein the collection-purposed overlay target measurement step includes:

moving the stage to a position where the first collection-purposed overlay target located at a site closest to the center of the wafer is formed, and measuring the first collection-purposed overlay target; and moving the stage to a position where the second collection-purposed overlay target located at a site second closest to the center of the wafer is formed, and measuring the second collection-purposed overlay target.

9. The overlay measurement method of claim 5, wherein the correction value calculation step of calculating, as the correction value, an average of distances respectively between a plurality of target coordinates and the center of the field of view of the lens unit.

10. The overlay measurement method of claim 5, wherein the application-purposed overlay target measurement step includes:

a second stage moving step of applying the correction value to move the stage so that the lens unit is located on top of a site where the application-purposed overlay target is formed; and a second pattern measurement step of measuring the application-purposed overlay target using the lens unit and the detector.

11. The overlay measurement method of claim 5, wherein the application-purposed overlay target measurement step includes:

measuring a first application-purposed overlay target, a second application-purposed overlay target to an n-th application-purposed overlay target among the plurality of overlay targets; and applying the correction value in moving the stage for measuring the first application-purposed overlay target, the second application-purposed overlay target to the n-th application-purposed overlay target.

12. The overlay measurement method of claim 5, wherein the method further comprises, after the application-purposed overlay target measurement step, repeating the correction value calculation step, wherein the application-purposed overlay target measurement step includes calculating a distance between an additional target coordinate of the application-purposed overlay target and the center of the field of view, wherein the correction value calculation step includes calculating the correction value, further based on the additional target coordinate.

* * * * *